May 8, 1934.  H. H. MARSHALL  1,957,548
EXPANSION VALVE
Filed May 15, 1930
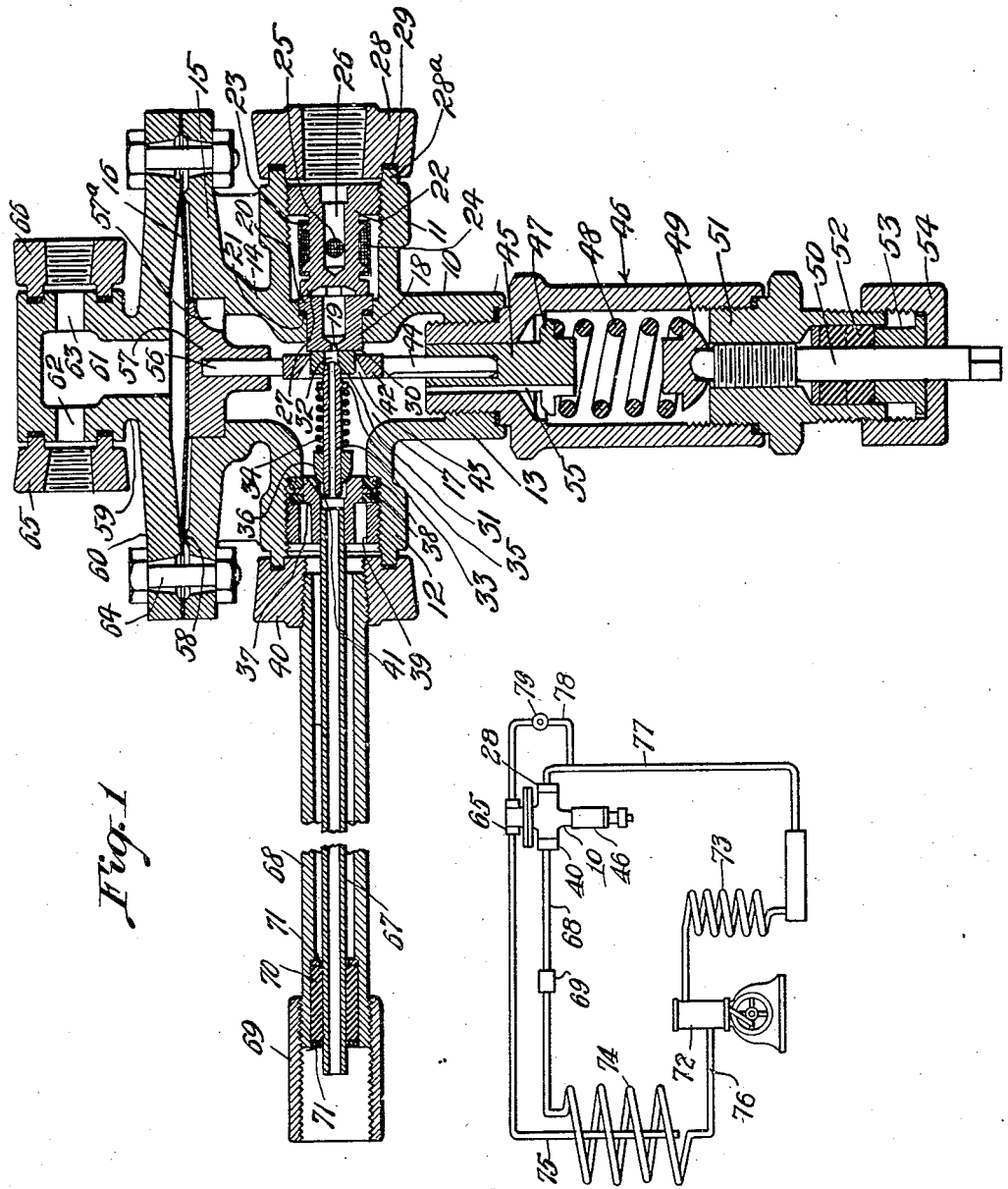
INVENTOR
HENRY H. MARSHALL
BY Archibald Coy
ATTORNEY Patented May 8, 1934

1,957,548

UNITED STATES PATENT OFFICE 1,957,548

EXPANSION VALVE

Henry H. Marshall, Highland Park, N. J., assignor, by mesne assignments, to Carrier Research Corporation, Newark, N. J., a corporation of New Jersey Application May 15, 1930, Serial No. 452,543

6 Claims. (Cl. 236—92)

The invention relates to an improvement in valves and more particularly to an improvement in expansion valves automatically opening and closing under thermostatic control.

In refrigerating systems, a thermostatic expansion valve gives control of evaporator conditions which could not be obtained by a constant pressure valve, it makes the entire evaporator surface effective to a maximum degree at all times, it increases the capacity of the system, and it decreases very materially the cost of operation. With thermostatic expansion valves heretofore in use, considerable trouble has arisen from irregularity in operation.

The general object of the invention is to provide an improved expansion valve particularly adapted for use in refrigerating systems. A further object is to provide an improved thermostatic expansion valve.

The aforesaid and other objects are attained by apparatus, of which the preferred form is illustrated in the accompanying drawing, in which the figure is a central section through the common axis of the inlet and the outlet and through the center of the diaphragm.

The illustrative form of the valve is adapted for use in refrigerating systems of the type disclosed in the patent to Marshall No. 630,617, dated August 8, 1899, and reference to such a system will be made in connection with the description of the present valve and its operation.

Fig. 1 is a sectional view of an illustrative form of valve incorporating the invention. Fig. 2 is a diagrammatic view of a refrigerating system in conjunction with which applicant's expansion valve may be used.

Referring to the drawing, 10 designates a valve body having at opposite sides thereof a tubular inlet portion 11 and a tubular outlet portion 12. At its bottom the valve body is provided with a downwardly extending tubular portion 13 and at its top with a tubular portion 14 terminating at its upper end in an annular flange 15 which is concave at its upper side and serves to support a diaphragm 16, preferably of steel and built up of laminations. At the inner end of the tubular portion 11 there is a cylindrical portion communicating with a chamber 17 at the interior of the body or casing 10. Closely fitting in such cylindrical opening is a sleeve 18 closed at its inner end except for a port 19 and provided at its outer end with a flange 20 fitting in an annular recess. The inner end of the sleeve 18 serves as a valve seat as will be brought out more fully hereinafter.

Interposed between the flange 20 and the bottom of the corresponding recess is a packing ring 21 to prevent leakage around the sleeve 18, and the sleeve 18 itself is held in position by means of a scale screen nut 22 of which the outer end is threaded into the internally threaded tubular portion 11. Said scale screen nut 22 has a reduced inner end at the outside of which are two annular flanges to support a scale screen 23 and providing between them an annular channel 24 to which fluid (the condensed refrigerating medium) is supplied through one or more openings 25 communicating with a central bore 26 extending to the outer end of said screen nut. At its inner end the screen nut is provided with projections 27 engaging the flange 20 of the sleeve 18 and providing between them openings through which the liquid passes to the interior of the sleeve.

Connection with a suitable source of supply for compressed fluid is provided by means of a member 28 secured to the tubular portion 11 in any suitable manner, said member 28 being provided with an internally threaded bore for connection with a suitable supply conduit and also with a circular groove adapted to receive a washer 29 of suitable material and also an annular flange 28a projecting from said tubular portion 11.

Preferably the inner end of the sleeve 18, which serves as a valve seat 30 containing the port 19, has a plane surface. Cooperating with said valve seat 30 is a slide valve 31 provided with a port 32 which, by movement of the slide valve, may be shifted into and out of position for communication with the port 19 in the valve seat. The slide valve 31 is provided at its side remote from the valve seat with a ball shaped socket connected with the port 32.

Tightly seated in said socket in the slide valve is the inner end of a tubular spindle or valve spring guide 33 surrounded by a helical compression spring 34 operatively connected at its inner end with said spring guide to urge the latter against the slide valve and not only maintain communication between the valve spring guide and the port in the valve but also to hold the valve in contact with the valve seat. As here shown the end of the spring adjacent to the valve engages an annular flange 35 on the guide 33. It will be seen that the slide valve 31 serves to make and break a connection between the port 19 in the valve seat 30 and the passage in the tubular spindle or member 33.

At the end thereof remote from the slide valve 31 the spring 34 engages a valve button 36 closely fitting over the tubular guide 33 but slidable therealong. The outer end of said button 36 is preferably ball shaped to fit closely in a suitably shaped inner end of an outlet bushing 37 which is provided at its inner end with an annular flange having at opposite sides thereof annular recesses to receive the inner edges of suitable heat insulating washers 38 which may be made of fibre. These washers extend outwardly beyond the central portion of this annular flange so as to prevent metallic connection between the bushing 37 and the tubular outlet portion 12 of the valve body.

The inner washer 38 is held in engagement with a shoulder, at the interior of said tubular portion 12, by means of a hollow nut 39 threaded into an interiorly threaded and enlarged portion of the bore of the bushing 37. It should be understood that the hollow nut 39 is spaced from the outer and smaller portion of the bushing 37 and that the inner end of said hollow nut engages the outer washer 38 but not the metal of the bushing or sleeve. The outer end of the outlet portion 12 may be closed by means of an internally threaded member 40 similar to the member 28 and connected with the outlet portion 12 in the same general manner as the member 28 is connected with the inlet portion 11.

The sleeve or bushing 37 is provided near the outer end of the valve spring guide 33 with a passage 41 extending from the interior of the chamber 17 forwardly and inwardly so that this passage and the central bore of the bushing converge towards the outlet of the casing 10. Said passage 41 provides communication between the interior of the sleeve or bushing and the chamber, and the arrangement is such that the liquid or compressed fluid flowing rapidly from the interior of the spindle or guide 33 produces an ejector action and tends to keep the compressed fluid in liquid form out of the said passage 41 and out of said chamber 17.

Control of the slide valve 31 is preferably effected by means of a valve driver or operating member 42 which has a valve receiving opening 43 flared outwardly from the side adjacent to the valve seat and of such dimensions that the valve 31 fits closely in the small end of said flared opening 43. For guidance and operation thereof, the valve driver 42 is provided at its lower end with a spindle 44 seated in a bore in a member or plug 45 slidable in the reduced upper end of a tubular member 46, said reduced upper end being screwed into an interiorly threaded portion of the downwardly extending tubular portion 13 of the valve body.

Near its lower end the member or plug 45 is provided with an annular flange 47 to be engaged by the upper end of a helical compression spring 48 enclosed in the larger portion of the tubular member 46. At its lower end the compression spring 48 is engaged by a spring cap 49 having at its lower side a depression to receive the upper end of the adjusting spindle 50. Said adjusting spindle 50 is provided near its upper end with an exterior screw thread which cooperates with a screw thread at the interior of a bore in a plug 51 screwed into the lower end of the tubular member 46.

The plug 51 is provided below said internally threaded portion with an opening of greater diameter to receive packing material 52 and said packing material is compressed by means of a packing gland 53 and a cap 54 engaging the packing gland and screwed over an exteriorly threaded part of the plug 51. The adjusting spindle 50 extends through the central portion of the cap 51 and is shaped at its lower end so that it can be turned by a suitable implement such as a wrench. In order to maintain the same pressure conditions in the interior the tubular member 46 and the interior of the chamber 17, communication between these two parts is provided for in a suitable manner, as by means of a groove 55 in the outer surface of the plug.

The valve driver is also provided with a spindle 56 in alignment with the spindle 44 and at the opposite side of the valve driver and this spindle 56 fits in a suitable bore in a pusher plate or member 57 which is guided in a corresponding bore in the upper portion of the valve body and engages the diaphragm 16 which preferably rests on an annular rib 58 at the concave upper side of the annular flange or support 15. Communication from the chamber 17 to the lower side of the diaphragm should be maintained at all times and this condition may be assured by providing a suitable recess or opening 57a at the edge of the pusher plate.

At the upper side of the diaphragm 16 is a member 59 including a lower part in the general form of an annular flange 60 having a concave lower side and engaging the diaphragm 16 near its periphery, and an axial chamber 61 extending upwardly from the inner edge of the flange 60 and communicating at its upper part with lateral passages 62 and 63, the use of which passages will be brought out hereinafter.

In order that the diaphragm 16 may be gripped at its periphery between the annular flanges 15 and 60 to provide a seal effective to prevent leakage at pressures such as occur under ordinary conditions, in the chamber 17 of the main valve body or in chamber 61, the flanges are clamped together by suitable means, such as bolts 64 and nuts cooperating therewith.

For convenience in connecting the passages 62 and 63 with suitable pipes or conduits, there may be provided at the outer ends of such passages members 65 and 66, respectively, having internally threaded passages communicating with the corresponding passages 62 and 63. These members 65 and 66 may be similar to the member 28 at the inlet of the valve body and may be secured in position in the same general manner.

The refrigerant medium, after passing from the outlet end of the valve spring guide 33 into the bushing 37, is discharged from the bushing through a delivery tube 67, of which the inner end fits closely in the outer end of the bushing and is spaced from the outlet end of the valve spring guide 33. By passing the refrigerating fluid from the inlet to the outlet of the valve casing 10 through the passage in the valve stem guide 33, the pressure is reduced only to an extent to permit a small part of the liquid refrigerant to be vaporized. Thus there is no great amount of absorption of heat from the surrounding parts and, inasmuch as the valve spring guide is surrounded by substantially inert gas, there will be no frosting of the valve body.

In order to prevent frost from working back from the cooling coils to the expansion valve, the delivery tube 67 is enclosed in a short tube or nipple 68 of which the interior diameter is greater than the external diameter of the delivery tube. The inner end of the nipple is connected with the valve body as by being screwed into the member 40 and the outer end of the nipple is connected with a conduit or pipe 69 connected with the cooling coils. As here shown the outer end of the nipple 68 is screwed into the pipe 69.

The outer end of the delivery tube 67 is preferably supported by means of a bushing 70, of thermally insulating material such as fibre, which fits closely around the delivery tube and closely in an enlarged portion of the inner passage of the nipple 68. Preferably the ends of the bushing 70 are protected by washers 71, of suitable material such as metal and of sufficient internal diameter as to be spaced from the delivery tube. The washer 71 at the side towards the valve engages the shoulder formed at the inner end of the enlarged portion and the other washer 71 is held against the outer end of the bushing 70 in any suitable manner as by turning in or riveting the material at the corresponding end of the nipple 68.

It should be understood that the present invention relates to the thermostatically controlled valve herein disclosed but does not relate especially to valve features independent of thermostatic control.

The operation of the valve will be described in connection with a refrigerating system including, a compressior 72, a condenser 73, expansion or cooling coils constituting an evaporator 74 in which the refrigerant in liquid form is allowed to vaporize and from which the vapor or gas is removed by the suction of the compressor or pump, and the expansion valve interposed in the line between the condenser and the expansion coils or evaporator and controlled automatically in accordance with conditions in the expansion coils by means of a thermostatic tube 75. When liquid refrigerant passes through the evaporator to the suction line 76 due to feeding an excess of the liquid refrigerant to the evaporator, the temperature in that part of the suction line approaches the temperature in the evaporator; and when the amount of liquid refrigerant fed to the evaporator is insufficient to correspond with the capacity of the evaporator, the gas is superheated when it enters the suction line, that is, the temperature of the gas or vapor in the suction line is higher than the temperature which corresponds with the evaporating pressure in the evaporator.

The inlet portion 11 of the valve is connected with the condenser to receive the liquid refrigerant therefrom and the outlet portion of the valve is connected with the evaporator to supply the refrigerant thereto at reduced pressure. The passage 62 in the member or cover 59 above the diaphragm 16 is connected with the thermostatic pipe or tube 75 of which the other or closed end is located so as to be subjected to the temperature in the suction pipe adjacent to the discharge end of the evaporator. The passage 63 in the cover 59 is connected with the high pressure line 77 between the condenser and the expansion valve and this connection 78 is kept closed by a valve 79 except when it is desired to introduce additional refrigerant to the thermostatic tube or device in order to increase the amount of fluid in the chamber 61 at the upper side of the diaphragm.

As a result of these connections, the pressure in the valve chamber 17 and at the lower surface of the diaphragm 16 varies directly with changes in pressure in the suction line or in the evaporator and the pressure in the chamber 61 at the upper side of the diaphragm varies with the temperature in the suction pipe. The pressure in the upper chamber 61 or in the thermostatic tube is greater than the pressure in the main valve chamber 17 and a suitable balance between these pressures is obtained by means of the spring 48 acting in the same direction as the pressure in the main chamber 17. The stress exerted by the spring 48 may be adjusted as desired by turning the regulating stem 50.

If there is an excessive amount of refrigerant supplied to the evaporator, the temperature in the thermostatic system will be lower than normal and cause a reduction in the pressure in the upper chamber 61, thus tending to raise the diaphragm and close the slide valve. On the other hand, a deficiency in the amount of refrigerant fed to the evaporator will result in decreasing the pressure in the chamber 17 and increasing the pressure in the upper chamber due to increase in temperature in the suction line, the action in both chambers being such as to tend to lower the diaphragm and open the valve.

I claim:

1. In an expansion valve, a valve body enclosing a chamber, a diaphragm forming a wall of said chamber, a valve seat having an inlet port for said chamber, a slide valve member having one face in constant engagement with said valve seat, a port in said valve member adapted to register with said inlet port, means including a spring acting on one end of said slide valve member to move said port out of register with said inlet port, a flexible connection providing a passage from the port in said valve member to the outlet of said chamber, a connection between the outlet end of said flexible connection and said chamber to control the pressure therein, a connection between the diaphragm and said slide valve member, and a secondary casing at the outer side of said diaphragm providing a chamber in which the pressure is controlled thermostatically in accordance with variation in temperature of the expanded fluid at the low pressure side of the valve.

2. In an expansion valve, a valve seat having an inlet port, a slide valve member having a port extending therethrough, said port being adapted to register with said inlet port, a spring for holding one face of said valve member in constant engagement with said seat, a chamber communicating with the discharge end of the valve and maintained at the corresponding pressure, a diaphragm forming a wall of said chamber and connected with one end of said valve member, and a chamber at the outer side of said diaphragm in which the pressure is controlled thermostatically in accordance with the temperature of the expanded fluid at the low pressure side of the valve.

3. In an expansion valve, a valve seat having an inlet port, a slide valve member having a port therethrough, said port being adapted to register with said inlet port, a flexible connection between said valve member and a discharge port for said valve, a spring for holding said flexible connection in constant engagement with the port in said valve member and also for holding a face of said valve member in constant engagement with said valve seat, a chamber communicating with the discharge end of the valve and maintained at the corresponding pressure, a diaphragm forming a wall of the chamber and connected with said slide valve member so that the increase of pressure in said chamber tends to close the valve, and a chamber at the outer side of said diaphragm in which the pressure is greater than at the inner side of the diaphragm and is controlled thermostatically in accordance with variations in temperature of the expanded fluid at the low pressure side of the valve.

4. In an expansion valve, a valve body enclosing a chamber, a diaphragm forming a wall of said chamber, a valve seat having an inlet port for said chamber, a reciprocable valve member in said chamber and having a port therein movable into and out of cooperation with said inlet port, means including a spring acting on said reciprocable valve member to urge the same to closed position, a flexible connection providing a restricted passage from the port in said valve member to the outlet of said chamber, a connection between the outlet end of said valve body and said chamber to control the pressure therein, a connection between the diaphragm and said reciprocable valve member, and a secondary casing at the outer side of said diaphragm providing a chamber in which the pressure is controlled thermostatically in accordance with variations in temperature of the expanded fluid at the low pressure side of the valve.

5. In an expansion valve to be interposed between a high pressure line and a low pressure line, the combination with a casing enclosing a chamber, a diaphragm constituting one wall of the chamber, an inlet and an outlet passage for said chamber, a seat with a port at said inlet passage, a slide with a port to cooperate with the port in the seat, a conduit with a restricted passage extending from said slide to said outlet passage and controlled by said slide as to communication with the port in the seat, a passage extending from said chamber to a point adjacent to the outlet of said restricted passage to determine the pressure in said chamber; of a chamber at the outer side of said diaphragm having connection with a thermostatic system in which the pressure varies in accordance with the temperature at a predetermined position in the low pressure line.

6. In an expansion valve to be interposed between a high pressure line and a low pressure line, the combination with a casing enclosing a chamber, a diaphragm constituting one wall of the chamber, an inlet and an outlet passage for said chamber, a seat with a port at said inlet passage, a slide with a port to cooperate with the port in the seat, a conduit extending from said slide to said outlet passage and controlled by said slide as to communication with the port in the seat, a passage extending from said chamber to a point adjacent to the outlet of said conduit to determine the pressure in said chamber; of a chamber at the outer side of said diaphragm adapted for connection with a thermostatic system in which the pressure varies in accordance with the temperature at a predetermined position in the low pressure line and connection with the high pressure side of the system through which high pressure fluid can be admitted to charge the thermostatic system.

HENRY H. MARSHALL.